(12) United States Patent
Kawashima et al.

(10) Patent No.: US 9,743,656 B2
(45) Date of Patent: Aug. 29, 2017

(54) GRAIN PEST CONTROL APPARATUS AND METHOD

(71) Applicant: SATAKE CORPORATION, Tokyo (JP)

(72) Inventors: Hideo Kawashima, Kuwana (JP);
Hidenori Mizuno, Hiroshima (JP);
Kazunobu Kajihara, Hiroshima (JP);
Yoichiro Ogura, Hiroshima (JP);
Yasunori Koike, Hiroshima (JP)

(73) Assignee: SATAKE CORPORATION, Tokyo (JP)

( * ) Notice: Subject to any disclaimer, the term of this patent is extended or adjusted under 35 U.S.C. 154(b) by 220 days.

(21) Appl. No.: 14/381,212

(22) PCT Filed: Feb. 7, 2013

(86) PCT No.: PCT/JP2013/052837
§ 371 (c)(1),
(2) Date: Aug. 26, 2014

(87) PCT Pub. No.: WO2013/129058
PCT Pub. Date: Sep. 6, 2013

(65) Prior Publication Data
US 2015/0113856 A1   Apr. 30, 2015

(30) Foreign Application Priority Data
Feb. 28, 2012   (JP) .................................. 2012-042562

(51) Int. Cl.
*A01M 17/00* (2006.01)
*A01M 1/20* (2006.01)
(Continued)

(52) U.S. Cl.
CPC ........ *A01M 17/008* (2013.01); *A01M 1/2094* (2013.01); *A01M 13/003* (2013.01); *A01M 17/00* (2013.01); *A01M 19/00* (2013.01)

(58) Field of Classification Search
CPC ...... A01M 17/00; A01M 1/2094; A01M 1/20; A01M 19/00; A01M 13/00; A01M 13/003; A01M 17/008; B01D 11/0226
(Continued)

(56) References Cited

U.S. PATENT DOCUMENTS 409,180 A * 8/1889 Ferguson .................. B07B 4/08
422/286
690,005 A * 12/1901 Anderson ........... A47J 37/1214
134/105
(Continued)

FOREIGN PATENT DOCUMENTS

BR   WO 2009049389 A1 *  4/2009  .......... A01M 17/008
CN       201586234 U       9/2010
(Continued)

OTHER PUBLICATIONS

Translation of JP2011-223934.*
(Continued)

*Primary Examiner* — Darren W Ark
(74) *Attorney, Agent, or Firm* — Orion Consulting, Ltd.; Joseph P. Farrar, Esq.

(57) ABSTRACT

A grain pest control apparatus includes an input unit adapted to accept input of grain; a heating unit adapted to heat the grain supplied from the input unit; and a removal unit adapted to remove heat from the grain heated by the heating unit, wherein the removal unit includes a cylindrical body provided with an air passage hole in a wall surface and adapted to receive the heated grain and a heat collecting chamber installed by surrounding the cylindrical body and
(Continued)

connected to an exhaust channel, and removes heat from the heated grain by causing air supplied into the cylindrical body to pass through the air passage hole and escape via the heat collecting chamber.

1 Claim, 4 Drawing Sheets

(51) Int. Cl.
*A01M 13/00* (2006.01)
*A01M 19/00* (2006.01)

(58) Field of Classification Search
USPC ......... 43/129, 130, 132.1, 124, 125; 422/26, 422/32, 38; 34/135, 136, 138, 140, 141; 162/58, 68, 60, 244
See application file for complete search history.

(56) References Cited

U.S. PATENT DOCUMENTS

| | | | | |
|---|---|---|---|---|
| 731,573 | A * | 6/1903 | Johnson | A47J 27/14 162/244 |
| 1,061,443 | A * | 5/1913 | Blosser | A61L 2/07 422/26 |
| 1,086,093 | A * | 2/1914 | Schuyler | B01D 11/0226 422/273 |
| 1,229,236 | A * | 6/1917 | Cross | A01M 5/04 43/144 |
| 1,234,214 | A * | 7/1917 | Reynolds | A01M 5/04 43/132.1 |
| 1,384,689 | A * | 7/1921 | Davis | F26B 17/16 34/171 |
| 1,510,610 | A * | 10/1924 | Hendricks | A01G 11/00 422/26 |
| 1,533,903 | A * | 4/1925 | Rylander | F26B 11/045 34/134 |
| 1,571,076 | A * | 1/1926 | Warren | F26B 11/182 34/134 |
| 2,040,600 | A * | 5/1936 | Davis | A01M 1/223 43/138 |
| 2,083,884 | A * | 6/1937 | Wells | D21B 1/32 162/187 |
| 2,163,628 | A * | 6/1939 | Pilkey | A23B 9/00 34/403 |
| 2,237,739 | A * | 4/1941 | Jones | A23L 3/10 422/26 |
| 2,319,673 | A * | 5/1943 | French | F26B 11/0413 34/128 |
| 2,355,091 | A * | 8/1944 | McDonald | B30B 9/121 100/125 |
| 2,388,298 | A * | 11/1945 | Stephens | A23F 5/04 34/135 |
| 2,469,814 | A * | 5/1949 | Crooks | A01M 13/00 239/145 |
| 2,571,555 | A * | 10/1951 | Fernandes | A23L 7/1975 34/138 |
| 2,848,198 | A * | 8/1958 | Bill | B01J 6/002 165/120 |
| 2,909,872 | A * | 10/1959 | Kearney | B08B 3/042 134/132 |
| 2,936,220 | A * | 5/1960 | Schwarting | B01J 6/00 165/88 |
| 2,975,898 | A * | 3/1961 | Bernhard | F26B 17/12 209/11 |
| 3,246,401 | A * | 4/1966 | Walser | D21F 5/02 34/115 |
| 3,341,280 | A * | 9/1967 | Eolkin | A23L 3/185 34/370 |
| 3,385,431 | A * | 5/1968 | Pletcher | A01M 1/2094 43/124 |
| 3,454,352 | A * | 7/1969 | McDonald | A61L 2/00 422/26 |
| 3,897,818 | A * | 8/1975 | Champel | A23L 3/10 422/26 |
| 4,255,459 | A * | 3/1981 | Glen | A23B 4/0053 426/510 |
| 4,289,579 | A * | 9/1981 | Forsberg | B01D 11/0223 34/135 |
| 4,422,846 | A * | 12/1983 | Weber | F26B 1/00 34/134 |
| 4,620,388 | A * | 11/1986 | Imagawa | A01M 17/008 43/130 |
| 4,632,729 | A * | 12/1986 | Laakso | D21C 1/00 162/60 |
| 4,676,152 | A * | 6/1987 | Tsuji | A23B 7/0053 99/468 |
| 4,716,676 | A * | 1/1988 | Imagawa | A01M 17/008 43/130 |
| 4,844,933 | A * | 7/1989 | Hsieh | A23B 5/02 426/511 |
| 4,888,882 | A * | 12/1989 | Ryham | F26B 17/22 34/130 |
| 4,921,674 | A * | 5/1990 | Enos | A01C 1/08 422/32 |
| 4,939,346 | A * | 7/1990 | Bailey | F26B 17/20 219/388 |
| 4,989,363 | A * | 2/1991 | Doernemann | A01M 17/008 43/132.1 |
| 5,146,841 | A * | 9/1992 | Zittel | A23B 7/06 100/117 |
| 5,203,108 | A * | 4/1993 | Washburn, Jr. | A01M 17/008 43/132.1 |
| 5,673,748 | A * | 10/1997 | May | C10B 1/10 34/134 |
| 5,802,961 | A * | 9/1998 | Hay | A23B 7/0053 165/111 |
| 6,073,365 | A * | 6/2000 | Halverson | A01M 1/226 34/168 |
| 6,171,561 | B1 * | 1/2001 | Williamson | A23B 7/0053 43/124 |
| 6,192,598 | B1 * | 2/2001 | Halverson | A01M 1/226 34/174 |
| 6,279,261 | B1 * | 8/2001 | Binker | A01M 17/008 43/125 |
| 6,368,555 | B1 * | 4/2002 | Goeldner | A61L 11/00 422/26 |
| 6,415,527 | B1 * | 7/2002 | Rasanen | F26B 11/045 34/135 |
| 6,682,697 | B2 * | 1/2004 | He | A61L 2/0088 422/32 |
| 7,931,860 | B1 * | 4/2011 | Lewis | A61L 11/00 422/26 |
| 8,124,009 | B2 * | 2/2012 | Danchenko | A23B 9/025 43/129 |
| 8,147,772 | B2 * | 4/2012 | Wilford | A61L 2/06 110/235 |
| 9,609,976 | B2 * | 4/2017 | Zittel | A47J 27/04 |
| 2010/0186285 | A1 * | 7/2010 | Schmitt | A01M 1/06 43/132.1 |
| 2014/0191057 | A1 * | 7/2014 | Eames | B05B 7/1626 239/8 |

FOREIGN PATENT DOCUMENTS

| | | | |
|---|---|---|---|
| GB | 539883 A * | 9/1941 | ......... A01M 17/008 |
| GB | 1138777 A * | 1/1969 | ......... A01M 17/008 |
| JP | S54-055743 A | 5/1957 | |
| JP | S59-140841 A | 8/1984 | |
| JP | S60-241859 A | 11/1985 | |
| JP | H02-286027 A | 11/1990 | |
| JP | H11-103802 A | 11/1990 | |
| JP | H04272583 A | 9/1992 | |
| JP | H08-56589 A | 3/1996 | |
| JP | 03029786 B2 | 4/2000 | |
| JP | 2000135273 A * | 5/2000 | |
| JP | 2001198196 A * | 7/2001 | |
| JP | 2004065073 A * | 3/2004 | |
| JP | 2005-000015 A | 1/2005 | |

(56) References Cited

FOREIGN PATENT DOCUMENTS

| JP | 2006-325510 | A |   | 12/2006 |
|----|-------------|---|---|---------|
| JP | 2006325510  | A | * | 12/2006 |
| JP | 2011-045303 | A |   | 3/2011  |
| JP | 2011-223934 | A |   | 11/2011 |
| JP | 2011223934  | A | * | 11/2011 |
| JP | 2013241977  | A |   | 12/2013 |
| WO | WO-2009/049389 | A1 | | 4/2009 |

OTHER PUBLICATIONS

Translation of JP2006-325510.*
International Preliminary Report for PCT/JP2013/052837 dated Apr. 24, 2014.
International Search Report PCT/JP2013/052837 dated May 21, 2013.
Chinese Office Action for Application No. 2013800113821 dated Feb. 15, 2016.

\* cited by examiner

GRAIN PEST CONTROL APPARATUS AND METHOD

TECHNICAL FIELD

The present invention relates to a grain pest control apparatus and method for exterminating insect pests, their larvae, their eggs, and the like which get mixed in, or parasitize, grain such as rice, wheat, soybeans, corn, almonds, and the like.

BACKGROUND ART

Conventionally, grain pests are exterminated mainly by pesticide spraying, which, however, tends to be avoided due to safety concerns. Thus, recently, many techniques have been proposed for exterminating grain pests by heating the grain (see, for example, Patent Literatures 1 and 2).

The technique described in Patent Literature 1 involves heating cereals by placing the cereals in contact with a high-temperature cylinder while the technique described in Patent Literature 2 involves heating cereals by a high-temperature gas.

The techniques described in the aforementioned patent literatures can exterminate insect pests, their larvae, their eggs, and the like which get mixed in, or parasitize, grain, by heating the grain by a high-temperature heating medium.

Now, the techniques described in the aforementioned patent literatures heat the grain for a short time by taking into consideration the influence of heat on the grain.

However, the techniques described in the aforementioned patent literatures heat the grain by a high-temperature heating medium, and cannot necessarily prevent the influence of heat on the grain by merely reducing a heating time. Consequently, there is a problem in that properties and condition of the grain will change, resulting in quality deterioration of the grain.

CITATION LIST

Patent Literature

Patent Literature 1 Japanese Patent Laid-Open No. 54-55743
Patent Literature 2 Japanese Patent Laid-Open No. 2006-325510

SUMMARY OF INVENTION

Technical Problem

Thus, an object of the present invention is to provide a grain pest control apparatus and method which can prevent the influence of heat on grain and eliminate the problem of quality deterioration of the grain even when insect pests, their larvae, their eggs, and the like which get mixed in, or parasitize, grain are exterminated by heating the grain.

Solution to Problem

In order to achieve the above object, a grain pest control apparatus according to the present invention comprises: an input unit adapted to accept input of grain; a heating unit adapted to heat the grain supplied from the input unit; and a removal unit adapted to remove heat from the grain heated by the heating unit, wherein the removal unit includes a cylindrical body provided with an air passage hole in a wall surface and adapted to receive the heated grain thereinto and a heat collecting chamber installed by surrounding the cylindrical body and connected to an exhaust channel, and removes heat from the heated grain by causing air supplied into the cylindrical body to pass through the air passage hole and escape via the heat collecting chamber.

In the grain pest control apparatus according to the present invention, preferably a hollow revolving roll with a plurality of ridges and a plurality of air blast grooves formed on a circumferential surface is disposed in the cylindrical body, the grain received into the cylindrical body is stirred by the plurality of ridges, and heat is removed from the grain by air blasting out from the plurality of air blast grooves.

In the grain pest control apparatus according to the present invention, preferably a rotating shaft with a plurality of stirring members fixed to a circumferential surface is disposed in the cylindrical body, a jet air duct is connected to the heat collecting chamber, the grain received into the cylindrical body is stirred by the plurality of stirring members, and heat is removed from the grain by air jetted out from the jet air duct.

The grain pest control apparatus according to the present invention further comprises: a steam generating unit adapted to generate superheated steam; and a separation unit adapted to separate the grain from the superheated steam, wherein preferably the heating unit includes a cylindrical member connected to a lower end of the input unit and placed vertically upright, causes the superheated steam generated by the steam generating unit to flow from an upper part to a lower part of the cylindrical member, and causes the grain supplied from the input unit to fall inside the cylindrical member, and the separation unit separates the grain falling inside the cylindrical member from the superheated steam at a lower end of the cylindrical member of the heating unit and discharges the grain toward the removal unit.

A grain pest control method according to the present invention comprises: a heating step of heating grain; and a removal step of removing heat from the grain heated in the heating step, wherein in the removal step, the grain heated in the heating step is received into a cylindrical body provided with an air passage hole formed in a wall surface and heat from the grain heated in the heating step is removed by causing air supplied into the cylindrical body to pass through the air passage hole and escape via a heat collecting chamber installed by surrounding the cylindrical body.

Advantageous Effects of Invention

Being provided with the removal unit adapted to remove heat from the grain heated by the heating unit, the grain pest control apparatus according to the present invention can prevent the influence of heat on grain due to heating and eliminate the problem of quality deterioration of the grain when exterminating insect pests and the like.

Moreover, in the grain pest control apparatus according to the present invention, the removal unit can remove dead insect pests, larvae, eggs, and other foreign matter through the air passage hole formed in the wall surface of the cylindrical body as well as remove heat from the grain, eliminating the need to remove dead bodies of insect pests and the like as well as other foreign matter from the grain in subsequent steps.

Besides, the grain pest control apparatus according to the present invention, can also remove condensed water attaching to the surfaces of the grain through the air passage hole formed in the wall surface of the cylindrical body, making it possible to dry the surfaces of the grain at an early stage and thereby preventing the grains in the cylindrical body from sticking to each other.

With the grain pest control apparatus according to the present invention, since the revolving roll with a plurality of ridges formed on the circumferential surface is disposed in the cylindrical body, when the grain supplied to the cylindrical body is stirred by the ridges of the revolving roll, the air supplied into the cylindrical body can efficiently remove the heat of the grain, the dead bodies of the insect pests, larvae, and eggs getting mixed in, or parasitizing, the grain, other foreign matter, and condensed water attaching to the surfaces of the grain.

In the grain pest control apparatus according to the present invention, since the heating unit includes the cylindrical member connected to the lower end of the input unit and placed vertically upright, causes the superheated steam generated by the steam generating unit to flow from an upper part to a lower part of the cylindrical member, and causes the grain supplied from the input unit to fall inside the cylindrical member, the grain can be heated by the high-temperature superheated steam in a short time, making it possible to destroy the insect pests, larvae, and eggs getting mixed in, or parasitizing, the grain.

Also, in the grain pest control apparatus according to the present invention, since the separation unit can separate the superheated steam serving as a heating source from the grain and then the removal unit can promptly remove heat from the surfaces of the grain using air, heat can be removed effectively from the grain.

Being provided with the removal step of removing heat from the grain heated in the heating step, the grain pest control method according to the present invention can prevent the influence of heat on grain due to heating and eliminate the problem of quality deterioration of the grain when exterminating insect pests and the like.

Also, the grain pest control method according to the present invention can remove insect pests, larvae, and eggs killed by heating, and other foreign matter as well as remove heat from the grain, eliminating the need to remove dead bodies of insect pests and the like as well as other foreign matter from the grain in subsequent steps.

Furthermore, the grain pest control method according to the present invention can also remove condensed water attaching to the surfaces of the grain, making it possible to dry the surfaces of the grain at an early stage and thereby preventing the grains in the cylindrical body from sticking to each other.

DESCRIPTION OF EMBODIMENTS

Embodiments of the present invention will be described with reference to the drawings.

Figure 1:
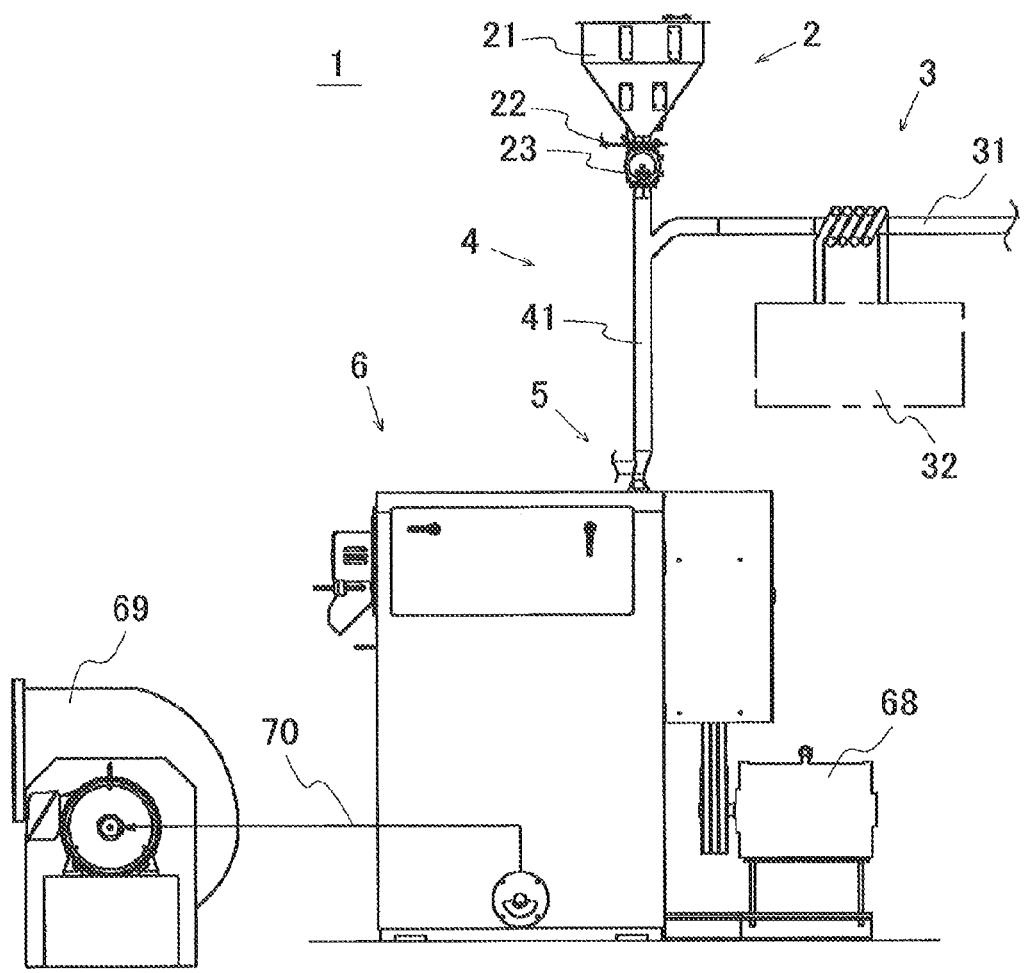
FIG. 1 is a general view of a grain pest control apparatus according to an embodiment of the present invention.
Figure 2A:
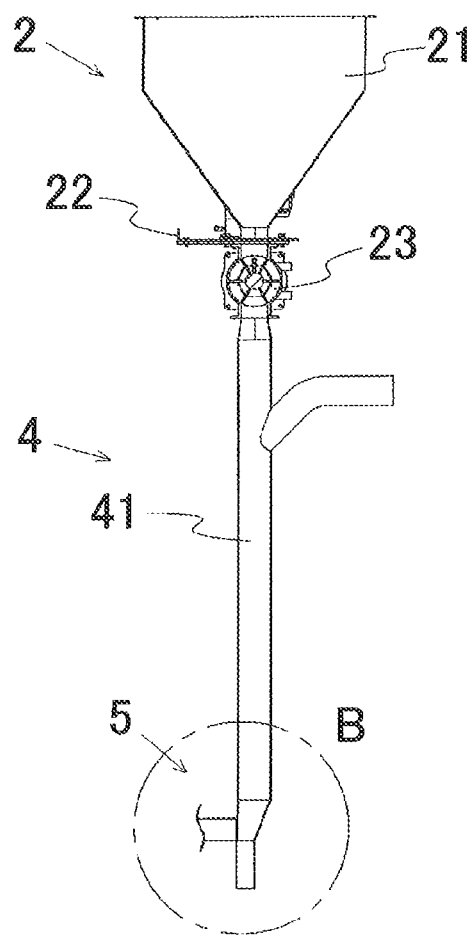
FIG. 2A is a sectional view of an input unit, heating unit, and separation unit in the apparatus of FIG. 1.
Figure 2B:
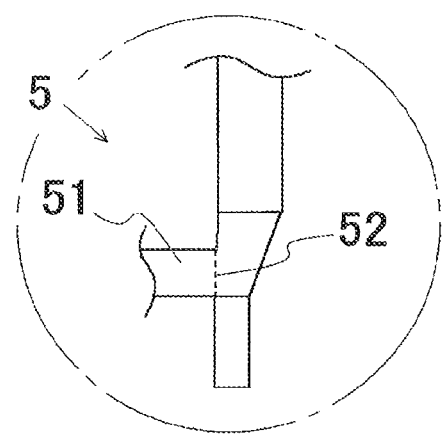
FIG. 2B is an enlarged view of part B in FIG. 2A.
Figure 3:
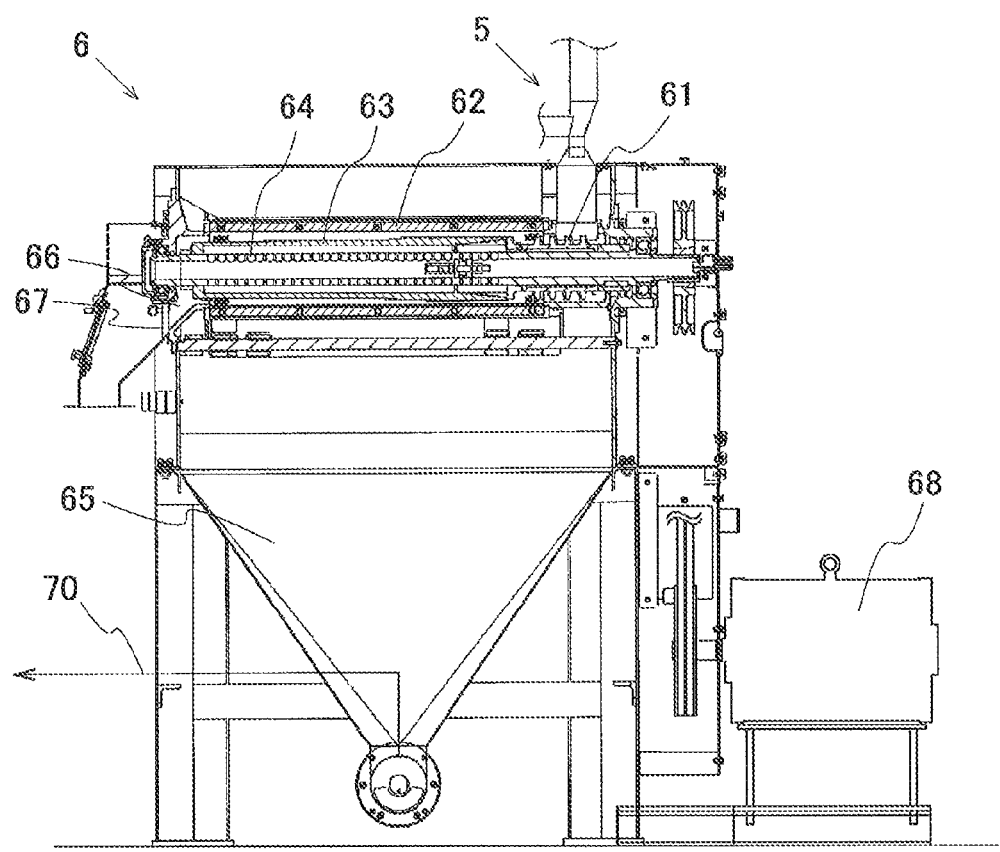
FIG. 3 is a schematic partial sectional view of a removal unit in the apparatus of FIG. 1.

FIG. 1 shows a general view of a grain pest control apparatus according to an embodiment of the present invention. FIG. 2A shows a sectional view of an input unit, heating unit, and separation unit in the grain pest control apparatus of FIG. 1. Also, FIG. 2B shows an enlarged view of part B in FIG. 2A. FIG. 3 shows a schematic partial sectional view of a removal unit in the grain pest control apparatus of FIG. 1.

The grain pest control apparatus 1 according to the present embodiment includes an input unit 2 adapted to accept input of grain serving as raw material, a steam generating unit 3 adapted to generate superheated steam, a heating unit 4 adapted to heat the grain supplied from the input unit 2, using the superheated steam supplied from the steam generating unit 3, a separation unit 5 adapted to separate the grain heated by the heating unit 4 from the superheated steam, and a removal unit 6 adapted to remove heat from the grain separated from the superheated steam by the separation unit 5.

The input unit 2 includes a hopper 21 to which grain such as well-polished white rice is inputted, a shutter 22 installed below the hopper 21, and a rotary valve 23 installed below the shutter 22.

The steam generating unit 3 includes a steam pipe 31 used to feed steam generated by heating water by a boiler (not shown) or the like and heating means made up of a radio-frequency induction heating device 32 adapted to heat the steam in the steam pipe 31 into superheated steam of 300 to 700° C. Note that as the heating means, well-known heating means such as an electric heater can be used here instead of the radio-frequency induction heating device 32.

The heating unit 4 includes a cylindrical member 41 placed in a vertically upright state below the input unit 2. The cylindrical member 41 is supplied intermittently with grain from the rotary valve 23. Also, an upper flank of the cylindrical member 41 is connected with the steam pipe 31 pointing downward at an angle, and the superheated steam is supplied, flowing downward through the cylindrical member 41. Here, the cylindrical member 41 is placed with an upper end closed by the rotary valve 23 to prevent the superheated steam from leaking above the cylindrical member 41.

The separation unit 5 includes a superheated-steam recovery pipe 51 which branches laterally in a lower end portion of the cylindrical member 41. A screen 52 meshed finer than grain size of the grain is placed at an inlet of the superheated-steam recovery pipe 51 and superheated steam is sucked in through the screen 52 by suction means such as a suction fan (not shown), thereby separating the grain falling inside the cylindrical member 41 from the superheated steam. Here, the superheated steam supplied to the cylindrical member 41 flows downward reliably in the cylindrical member 41 by the action of the suction means (not shown). Note that the separation unit 5 does not necessarily need to laterally branch the superheated-steam recovery pipe 51 in the cylindrical member 41 as long as the separation unit 5 can suck the superheated steam through the screen 52 in the lower end portion of the cylindrical member 41, thereby separating the grain falling inside the cylindrical member 41 from the superheated steam.

The removal unit 6 includes a feed roll 61 adapted to sequentially supply the grain discharged from the separation unit 5 into a cylindrical body 62 (described below), the cylindrical body 62 adapted to receive the grain supplied by the feed roll 61, a hollow revolving roll 63 disposed in the cylindrical body 62, a hollow rotating shaft 64 configured to be open at both ends and disposed in the revolving roll 63, a heat collecting chamber 65 installed by surrounding the cylindrical body 62, a discharge port 66 adapted to discharge the grain from the cylindrical body 62, and a resistance plate 67 disposed so as to close the discharge port 66.

Being provided with a wall surface shaped as a polygonal prism in which a large number of air passage holes are formed, the cylindrical body 62 is fixed in the apparatus by being installed laterally. Here, the holes formed in the wall surface of the cylindrical body 62 are smaller in diameter than the grain serving as raw material. Alternatively, the cylindrical body 62 may have a cylindrical wall surface.

The revolving roll 63 has plural ridges and plural air blast grooves formed on a circumferential surface. Also, the rotating shaft 64 is provided with plural ventilating holes in a circumferential surface, fitted with the feed roll 61 and the revolving roll 63, and disposed in the apparatus in such a way as to be rotationally drivable by a motor 68. Furthermore, the heat collecting chamber 65 is connected to an exhaust channel 70 communicated with the suction fan 69 shown in FIG. 1.

Next, operation of the grain pest control apparatus according to the present embodiment will be described.

In the grain pest control apparatus according to the present embodiment, the grain inputted in the hopper 21 of the input unit 2 is supplied stably to the cylindrical member 41 of the heating unit 4 via the rotary valve 23 when the shutter 22 is opened.

The superheated steam generated in the steam generating unit 3 is supplied to the cylindrical member 41 so as to flow downward from above, the grain supplied from the input unit 2 is heated while falling freely in the superheated steam of cylindrical member 41, and consequently insect pests, their larvae, their eggs, and the like getting mixed in, or parasitizing, the grain are exterminated.

The grain with insect pests and eggs killed by the heating is separated from the superheated steam by the separation unit 5 installed in the lower end portion of the cylindrical member 41 as the superheated steam is sucked in through the screen 52 by the suction means (not shown), and then the grain is discharged to the removal unit 6. On the other hand, the superheated steam sucked by the suction means is recovered through the superheated-steam recovery pipe 51, returned to water by being condensed by a condenser or the like, and then used again as steam.

In the removal unit 6, the rotating shaft 64 is rotationally driven by the motor 68, and the grain is supplied sequentially into the cylindrical body 62 by the feed roll 61 mounted on the rotating shaft 64. Then, the grain supplied into the cylindrical body 62 moves toward the discharge port 66 while being stirred by the plural ridges formed on a circumferential surface of the revolving roll 63. On the other hand, in the removal unit 6, air is sucked through the openings at both ends of the rotating shaft 64 by the action of the suction fan 69, and the air blasts out from the plural air blast grooves formed on the circumferential surface of the revolving roll 63 via the plural ventilating holes formed in the circumferential surface of the rotating shaft 64, efficiently removing heat from the surfaces of the grain moving in the cylindrical body 62, in combination with the stirring of the grain by the plural ridges. Then, the hot air is sucked into the heat collecting chamber 65 through the large number of air passage holes formed in the wall surface of the cylindrical body 62 and discharged out of the apparatus through the exhaust channel 70.

In the grain pest control apparatus according to the embodiment of the present invention, the heating unit 4 heats the grain using the high-temperature superheated steam, making it possible to destroy the insect pests, larvae, and eggs getting mixed in, or parasitizing, the grain. Also, in the grain pest control apparatus according to the embodiment of the present invention, the separation unit 5 separates the superheated steam from the grain and then the removal unit 6 promptly removes heat from the surfaces of the grain using air, making it possible to adequately prevent the influence of heat on the grain and eliminate the problem of changes in the properties of the grain and resulting quality deterioration of the grain.

Also, in the grain pest control apparatus according to the embodiment of the present invention, dead insect pests, larvae, eggs, and other foreign matter can be discharged through the large number of air passage holes formed in the wall surface of the cylindrical body 62 together with hot air, eliminating the need to remove dead bodies of insect pests and the like as well as other foreign matter from the grain in subsequent steps.

Furthermore, in the grain pest control apparatus according to the embodiment of the present invention, condensed water attaching to the surfaces of the grain can be discharged together with the hot air through the large number of air passage holes formed in the wall surface of the cylindrical body 62, making it possible to dry the surfaces of the grain at an early stage and thereby preventing the grains in the cylindrical body 62 from sticking to each other.

Now, results of insecticidal testing and ovicidal testing on rice weevils using the grain pest control apparatus will be described, the rice weevils parasitizing well-polished white rice.

Table 1 shows the results of insecticidal testing on rice weevils. In the insecticidal testing, a breathable, heat-resistant bag containing 10 rice weevils was placed in the cylindrical member 41 of the heating unit 4, the heat-resistant bag was heated by superheated steam for 0.5 seconds and taken out, and then the number of killed rice weevils was counted, thereby assessing the influence of temperature on the rice weevils.

TABLE 1

| | Test conditions Steam temperature | Test results | |
|---|---|---|---|
| No. | (° C.) | Number of kills | Kill rate (%) |
| 1 | 600 | 10 | 100 |
| 2 | 400 | 10 | 100 |
| 3 | 300 | 10 | 100 |
| 4 | 100 | 10 | 100 |
| 5 | 90 | 10 | 100 |
| 6 | 70 | 1 | 10 |

It can be seen from Table 1 that when the heating time is 0.5 seconds, rice weevils can be killed if the heating temperature by steam is 90° C. or above.

Table 2 shows results of ovicidal testing on rice weevils. In the ovicidal testing, test samples were produced by mixing standard white rice with well-polished white rice containing eggs, larvae, and pupae of rice weevils, and supplied to the cylindrical member 41 of the heating unit 4 supplied with superheated steam. Then, the test samples were allowed to fall in the cylindrical member 41 for 0.5 seconds and stored in a constant temperature bath at a temperature of 30° C. and a humidity of 60% for 30 days. The number of imagoes was counted 10 days later, 20 days later, and 30 days later, thereby assessing the influence of temperature on the eggs of rice weevils. Note that results obtained by storing test samples in the constant temperature bath without heating are shown in No. 1 row of Table 2 for comparison. Table 2 also shows surface temperatures of well-polished white rice before and after the heating and without heating.

TABLE 2

| No. | | Steam temperature (° C.) | Number of imagoes | | | | Surface temperature of rice (° C.) |
|---|---|---|---|---|---|---|---|
| | | | 10 days later | 20 days later | 30 days later | Total | |
| 1 | 1 | — | 63 | 174 | 197 | 563 | 28.3 |
| | 2 | | 59 | 144 | 166 | | |
| | 3 | | 73 | 181 | 200 | | |
| 2 | 1 | 300 | 7 | 9 | 10 | 32 | 49.8 |
| | 2 | | 6 | 15 | 15 | | 49.6 |
| | 3 | | 0 | 6 | 7 | | 50.5 |
| 3 | 1 | 450 | 0 | 2 | 2 | 17 | 55.0 |
| | 2 | | 0 | 5 | 6 | | 54.6 |
| | 3 | | 3 | 9 | 9 | | 53.4 |
| 4 | 1 | 600 | 0 | 2 | 5 | 9 | 55.0 |
| | 2 | | 0 | 1 | 3 | | 59.6 |
| | 3 | | 1 | 1 | 1 | | 56.4 |

It can be seen from Table 2 that the higher the heating temperature by steam, the smaller the number of the weevil eggs which develop into imagoes. It can be seen that when the heating time is 0.5 seconds, eggs of rice weevils can be almost exterminated if the heating temperature is 300° C. or above. Also, it can be seen that when the heating time is 0.5 seconds, even if the heating temperature is 600° C., the surface temperature of well-polished white rice is less than 60° C., which is approximately equal to the starting temperature of pregelatinization.

The results of insecticidal testing and ovicidal testing on rice weevils shown above in Tables 1 and 2 indicate that when well-polished white rice as grain is heated by the heating unit 4 for 0.5 seconds using superheated steam of 300 to 600° C., the grain pest control apparatus according to the embodiment of the present invention can almost exterminate insect pests, their larvae, their eggs, and the like getting mixed in, or parasitizing, the well-polished white rice.

Also, it can be seen from Table 2 that since the surface temperature of well-polished white rice heated by the heating unit 4 is less than 60° C., which is approximately equal to the starting temperature of pregelatinization, if the well-polished white rice thus heated is separated by the separation unit 5 from the superheated steam serving as a heating source and heat is removed from the surfaces of the well-polished white rice by the removal unit 6 using air immediately afterward, the grain pest control apparatus according to the embodiment of the present invention can adequately prevent the influence of heat on the well-polished white rice.

Note that although in the embodiment of the present invention, it has been stated that the removal unit 6 drives the suction fan 69 to suck air through the openings at both ends of the hollow rotating shaft 64, a jet air fan may be newly provided to supply air from the jet air fan into a hollow rotating shaft with a closed end via an air flow path such that the supplied air will pass through the plural ventilating holes formed in the circumferential surface of the rotating shaft 64 and blast out from the plural air blast grooves formed on the circumferential surface of the revolving roll 63.

Although in the embodiment of the present invention, it has been stated that the heating unit 4 heats the grain allowed to fall freely in the cylindrical member 41 through which superheated steam flows downward from above, and thereby kills insect pests, their larvae, their eggs, and the like getting mixed in, or parasitizing, the grain, the method may be replaced by any of all sorts of heating techniques, such as described in Patent Literatures 1 and 2, for exterminating insect pests and the like parasitizing grain, using heat.

Another Embodiment of the Present Invention

Figure 4:
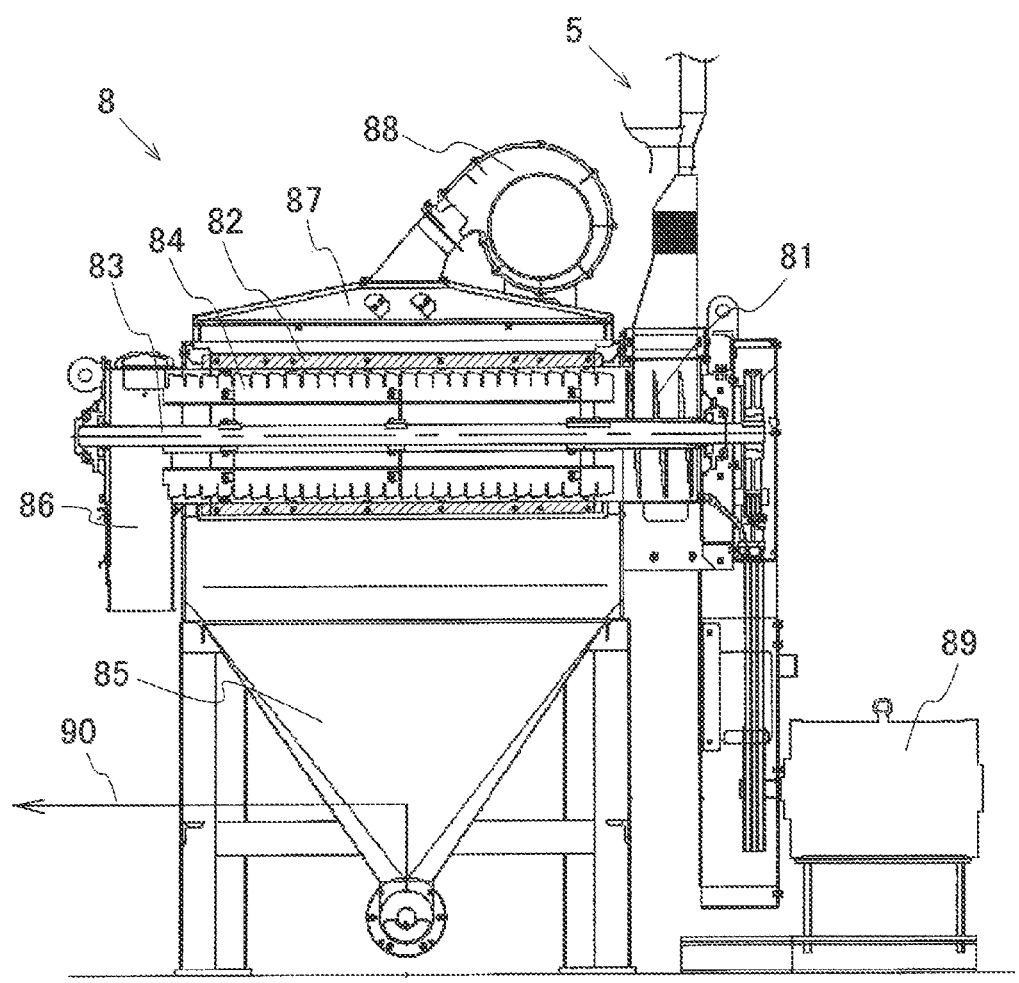
FIG. 4 is a schematic partial sectional view of a removal unit in a grain pest control apparatus according to another embodiment of the present invention.

FIG. 4 shows a schematic partial sectional view of a removal unit in the grain pest control apparatus according to another embodiment of the present invention.

The grain pest control apparatus according to the present embodiment differs from the grain pest control apparatus shown in FIG. 1 only in the configuration of the removal unit, and thus configuration description of components other than the removal unit will be omitted.

The removal unit 8 of the grain pest control apparatus according to the present embodiment includes a feed roll 81 adapted to sequentially supply the grain discharged from the separation unit 5 into a cylindrical body 82 (described below), the cylindrical body 82 adapted to receive the grain supplied by the feed roll 81, a rotating shaft 83 disposed in the cylindrical body 82, plural stirring blades 84 fixed to the rotating shaft 83 and disposed so as to be able to rotate integrally with the rotating shaft 83, a heat collecting chamber 85 installed by surrounding the cylindrical body 82, a discharge port 86 adapted to discharge the grain from the cylindrical body 82, a jet air duct 87 connected to the heat collecting chamber 85, and a jet air fan 88 adapted to supply air to the jet air duct 87.

Being provided with a wall surface shaped as a polygonal prism in which a large number of air passage holes are formed, the cylindrical body 82 is fixed in the apparatus by being installed laterally. Here, the holes formed in the wall surface of the cylindrical body 82 are smaller in diameter than the grain serving as raw material. Alternatively, the cylindrical body 82 may have a cylindrical wall surface.

The rotating shaft 83 is fitted with the feed roll 81 and disposed in the apparatus in such a way as to be rotationally drivable by a motor 89. Also, the heat collecting chamber 85 is connected to an exhaust channel 90 communicated with a suction fan (not shown).

The jet air duct 87 is connected to upper part of the heat collecting chamber 85 with a jet nozzle being open toward the cylindrical body 82 such that the air sent from the jet air fan 88 can be jetted into the cylindrical body 82 from above the cylindrical body 82.

In the removal unit 8, the rotating shaft 83 is rotationally driven by the motor 89, and the grain is supplied sequentially into the cylindrical body 82 by the feed roll 81 mounted on the rotating shaft 83. Then, the grain supplied into the cylindrical body 82 moves in the cylindrical body 82 toward the discharge port 86 while being stirred by the plural stirring blades 84 fixed to the rotating shaft 83. On the other hand, in the removal unit 8, the air jetted from the jet nozzle of the jet air duct 87 toward a top face of the cylindrical body 82 rushes into the cylindrical body 82 through the large number of air passage holes formed in the wall surface of the cylindrical body 82, removing heat efficiently from the surfaces of the grain moving in the cylindrical body 82, in combination with the stirring of the grain by the plural stirring blades 84. Then, by the force of the air flowing into the cylindrical body 82 and the sucking action of the suction fan (not shown), the hot air flows out into the heat collecting chamber 85 on the underside of the cylindrical body 82 through the large number of air passage holes formed in the wall surface of the cylindrical body 82 and is discharged out of the apparatus through the exhaust channel 90.

Again, with the grain pest control apparatus according to the present embodiment of the present invention, the removal unit 8 promptly removes heat from the surfaces of the grain using air, making it possible to adequately prevent the influence of heat on the grain and eliminate the problem of changes in the properties of the grain and resulting quality deterioration of the grain.

Also, in the grain pest control apparatus according to the embodiment of the present invention, again, dead insect pests, larvae, eggs, and other foreign matter can be discharged through the large number of air passage holes formed in the wall surface of the cylindrical body 82 together with hot air, eliminating the need to remove dead bodies of insect pests and the like as well as other foreign matter from the grain in subsequent steps.

Furthermore, in the grain pest control apparatus according to the embodiment of the present invention, again, condensed water attaching to the surfaces of the grain can be discharged together with the hot air through the large number of air passage holes formed in the wall surface of the cylindrical body 82, making it possible to dry the surfaces of the grain at an early stage and thereby preventing the grains in the cylindrical body 82 from sticking to each other.

Since the air sent from the jet air fan 88 is jetted in high volume from the jet nozzle of the jet air duct 87 toward the top face of the cylindrical body 82, the grain pest control apparatus according to the embodiment of the present invention is very effective in removing heat from the surfaces of the grain using the removal unit, removing dead bodies of insect pests and the like as well as other foreign matter from the grain, and discharging condensed water attaching to the surfaces of the grain.

Needless to say, the present invention is not limited to the embodiments described above and the configuration of the present invention can be changed as appropriate without departing from the scope of the invention.

INDUSTRIAL APPLICABILITY

The present invention is extremely useful in that the invention can prevent the influence of heat on grain when exterminating insect pests and the like by heating.

REFERENCE SIGNS LIST

1 grain pest control apparatus
2 Input unit
21 Hopper
22 Shutter
23 Rotary valve
3 Steam generating unit
31 Steam pipe
32 Radio-frequency induction heating device
4 Heating unit
41 Cylindrical member
5 Separation unit
51 Superheated-steam recovery pipe
52 Screen
6 Removal unit
61 Feed roll
62 Cylindrical body
63 Revolving roll
64 Rotating shaft
65 Heat collecting chamber
66 Discharge port
67 Resistance plate
68 Motor
69 Suction fan
70 Exhaust channel
8 Removal unit
81 Feed roll
82 Cylindrical body
83 Rotating shaft
84 Stirring blade
85 Heat collecting chamber
86 Discharge port
87 Jet air duct
88 Jet air fan
89 Motor
90 Exhaust channel

The invention claimed is:

1. A grain pest control apparatus comprising:
an input unit adapted to accept input of grain;
a heating unit adapted to heat the grain supplied from the input unit; and
a removal unit adapted to remove heat from the grain heated by the heating unit;
wherein the removal unit includes a cylindrical body provided with an air passage hole in a wall surface of the cylindrical body and adapted to receive the heated grain thereinto and a heat collection chamber installed by surrounding the cylindrical body and connected to an exhaust channel,
wherein a rotating shaft with a plurality of stirring members fixed to a circumferential surface of a revolving roll fitted to the rotating shaft is disposed in the cylindrical body, the grain received into the cylindrical body is stirred by the plurality of stirring members, and by causing air supplied into the cylindrical body to pass through the air passage hole and escape via the heat collecting chamber, heat is removed from the grain by air discharged out of the apparatus through the exhaust channel,
the grain pest control apparatus further comprising a steam generating unit adapted to generate superheated steam and a separation unit adapted to separate the grain from the superheated steam,
wherein a cylindrical member of the heating unit is both connected to a lower end of the input unit and placed vertically upright, and the heating unit causes the superheated steam generated by the steam generating unit to flow from an upper part to a lower part of the cylindrical member, and causes the grain supplied from the input unit to fall inside the cylindrical member, and
the separation unit separates the grain falling inside the cylindrical member from the superheated steam at the lower end of the cylindrical member of the heating unit and discharges the grain toward the removal unit.

* * * * *